(12) United States Patent
Ohmer et al.

(10) Patent No.: US 6,604,710 B2
(45) Date of Patent: Aug. 12, 2003

(54) LIGHT AIRCRAFT FUSELAGE AND STRUCTURAL FRAME CONNECTORS

(75) Inventors: Richard Edward Ohmer, Hickory, NC (US); Timothy John Ohmer, Gastonia, NC (US)

(73) Assignee: RST Aircraft Corporation, Hickory, NC (US)

( * ) Notice: Subject to any disclaimer, the term of this patent is extended or adjusted under 35 U.S.C. 154(b) by 78 days.

(21) Appl. No.: 09/866,246

(22) Filed: May 29, 2001

(65) Prior Publication Data

US 2002/0179772 A1 Dec. 5, 2002

(51) Int. Cl.[7] .................................................. B64C 1/08
(52) U.S. Cl. .................... 244/119; 244/131; 403/170; 403/180; 403/217; 446/124; 446/126
(58) Field of Search ................................. 244/119, 131, 244/117 R, 120, 123; 403/169, 170, 171, 172, 217, 219, 180; 52/653.1, 653.2, 655.1; 446/124, 126

(56) References Cited

U.S. PATENT DOCUMENTS

| | | | |
|---|---|---|---|
| 1,198,263 A | | 9/1916 | Pajeau |
| 1,588,268 A | | 6/1926 | Roche |
| 1,751,957 A | * | 3/1930 | Towle |
| 1,852,208 A | | 4/1932 | Huggins |
| 1,880,481 A | | 10/1932 | Ragsdale |
| 1,881,296 A | | 10/1932 | Potez |
| 2,149,476 A | | 3/1939 | Tetzlaff |
| 2,149,844 A | * | 3/1939 | George |
| 2,367,750 A | * | 1/1945 | Berkow et al. |
| 2,709,318 A | | 3/1955 | Benjamin |
| 2,818,226 A | * | 12/1957 | Hiller et al. |
| 2,976,968 A | | 3/1961 | Fentiman |
| 3,048,109 A | | 8/1962 | Feemster |
| 3,445,129 A | * | 5/1969 | Penote |
| 3,632,147 A | | 1/1972 | Finger |
| 4,259,821 A | | 4/1981 | Bush |
| 4,479,662 A | | 10/1984 | Defour et al. |
| 4,612,070 A | | 9/1986 | Sikka |
| 4,624,425 A | | 11/1986 | Austin et al. |
| 4,624,599 A | | 11/1986 | Piasecki |
| 4,627,149 A | | 12/1986 | Colas |
| 4,660,345 A | | 4/1987 | Browning |
| 4,728,113 A | | 3/1988 | Thun, Jr. |
| 4,776,721 A | | 10/1988 | Lange |
| 4,822,199 A | | 4/1989 | Nehls |
| 4,930,930 A | | 6/1990 | Coppa |
| 5,169,258 A | | 12/1992 | Raynak |
| 5,399,043 A | | 3/1995 | Plumeyer |
| 5,518,208 A | * | 5/1996 | Roseburg |
| 5,549,408 A | | 8/1996 | Lo |
| 6,032,430 A | | 3/2000 | Soukup |
| 6,126,113 A | * | 10/2000 | Navickas |

FOREIGN PATENT DOCUMENTS

FR 566256 4/1958

* cited by examiner

Primary Examiner—Tien Dinh
(74) Attorney, Agent, or Firm—Robert W. Pitts

(57) ABSTRACT

A structural frame or truss, suitable for use as part of a light aircraft fuselage includes steel tubular members joined by structural connectors or connector blocks. The blocks include bore holes into which the ends of lateral tubular members are inserted, and longitudinal tubes or longerons are inserted through holes extending between opposed block faces. The structural connector blocks not only connect the tubular members, but they serve as jigs for assembling the structural frame. Tubes can be plug welded to the blocks, and the fuselage outer skin can be attached to the structural connectors to form a dual fuselage structure.

33 Claims, 10 Drawing Sheets

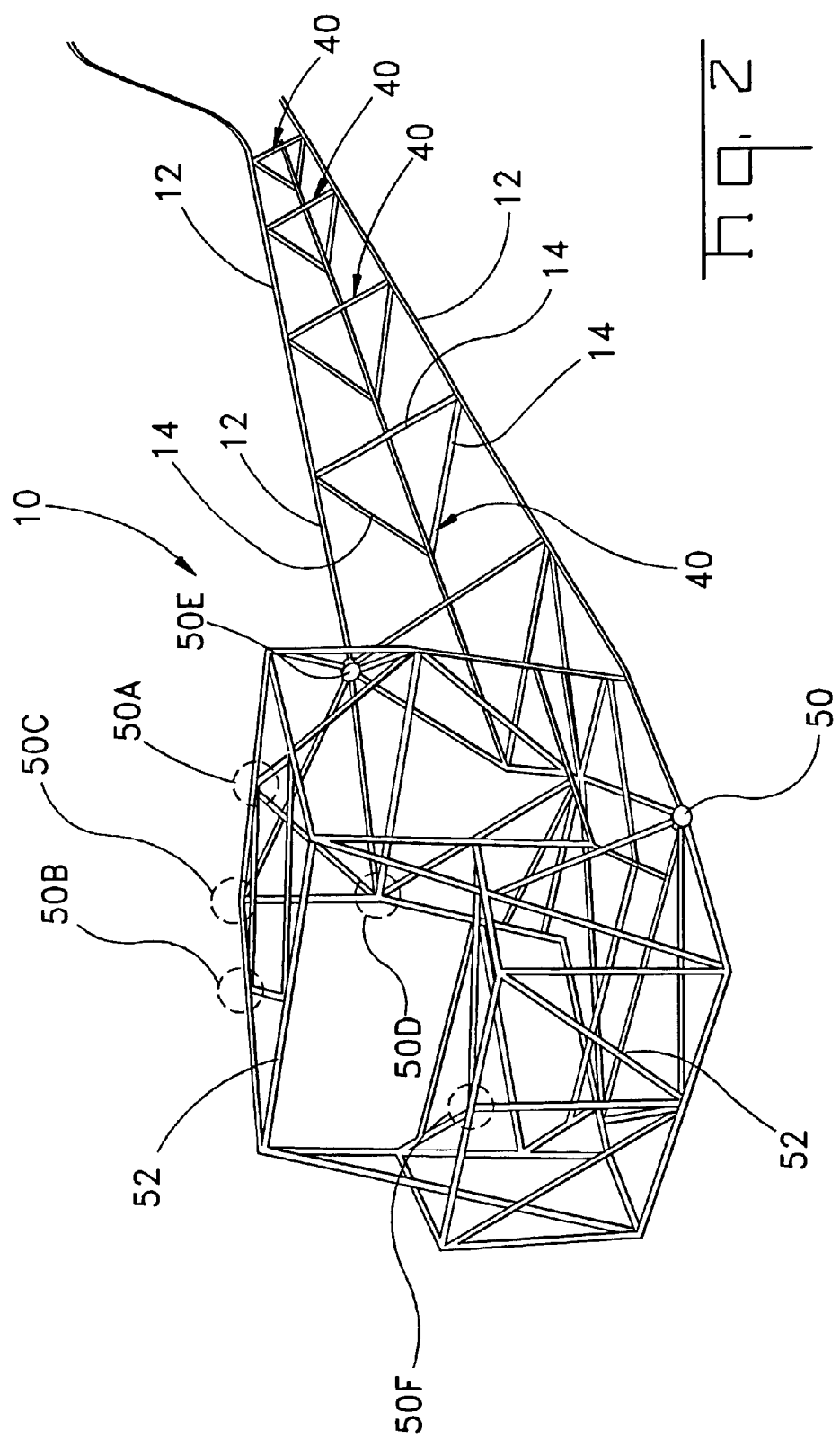

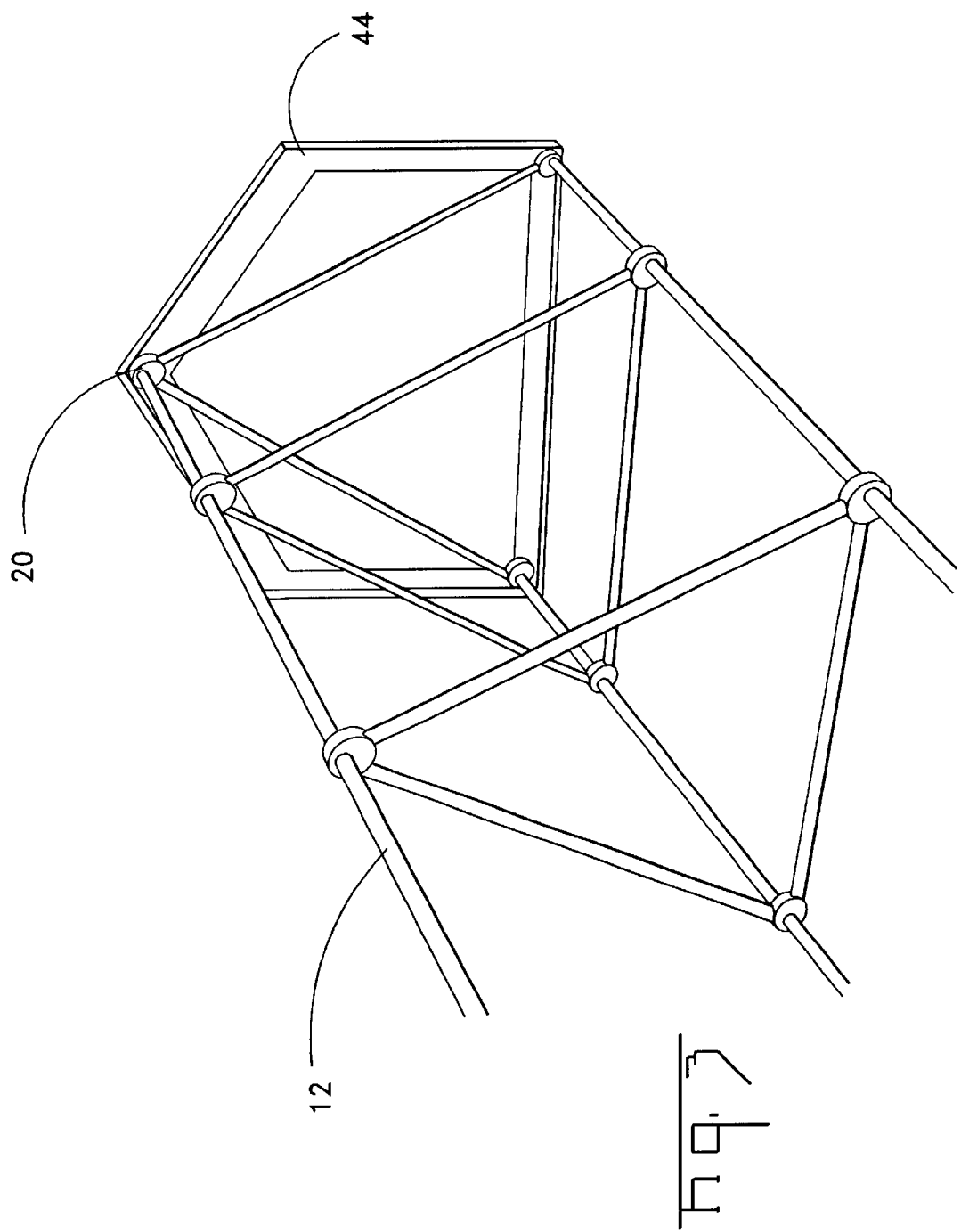

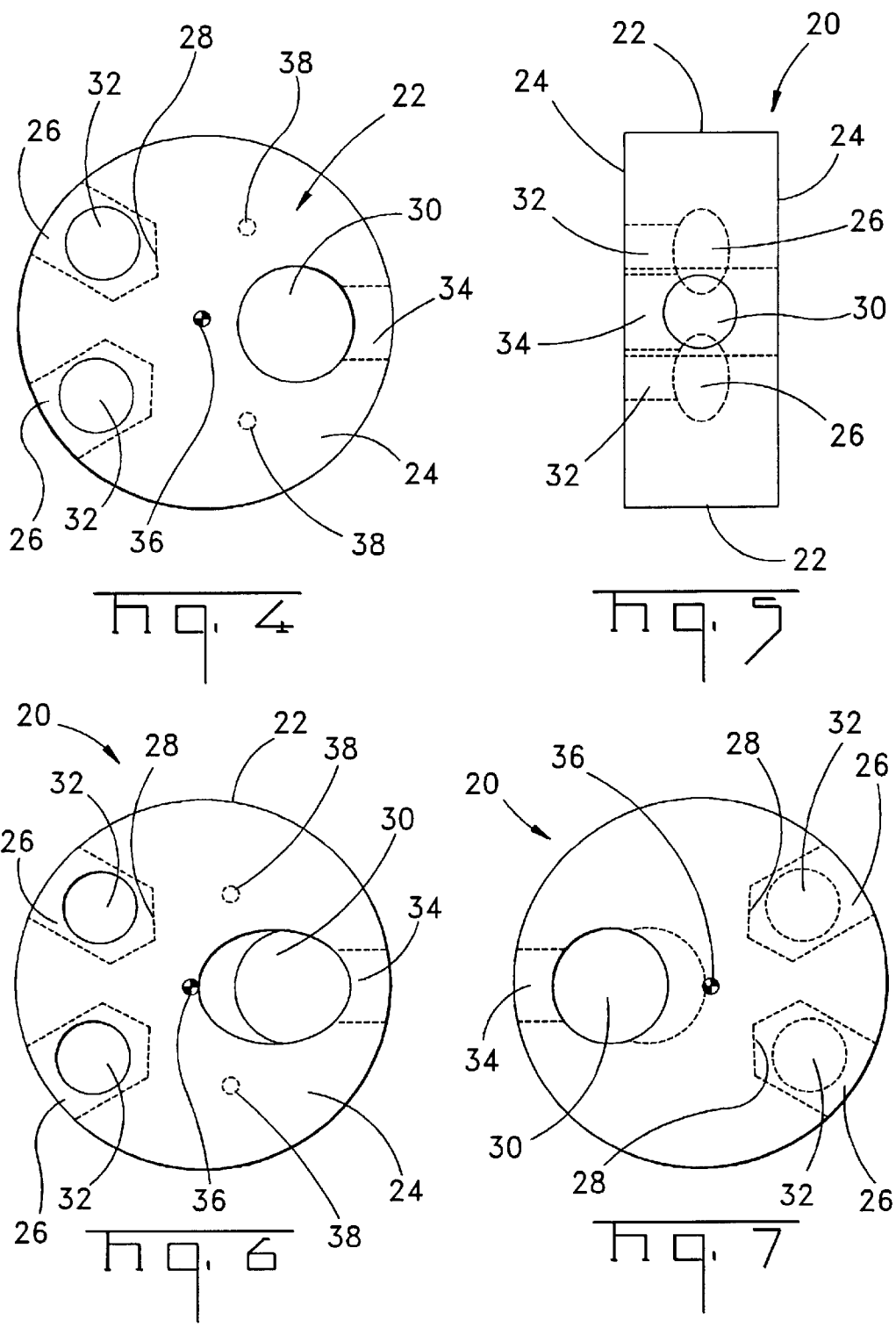

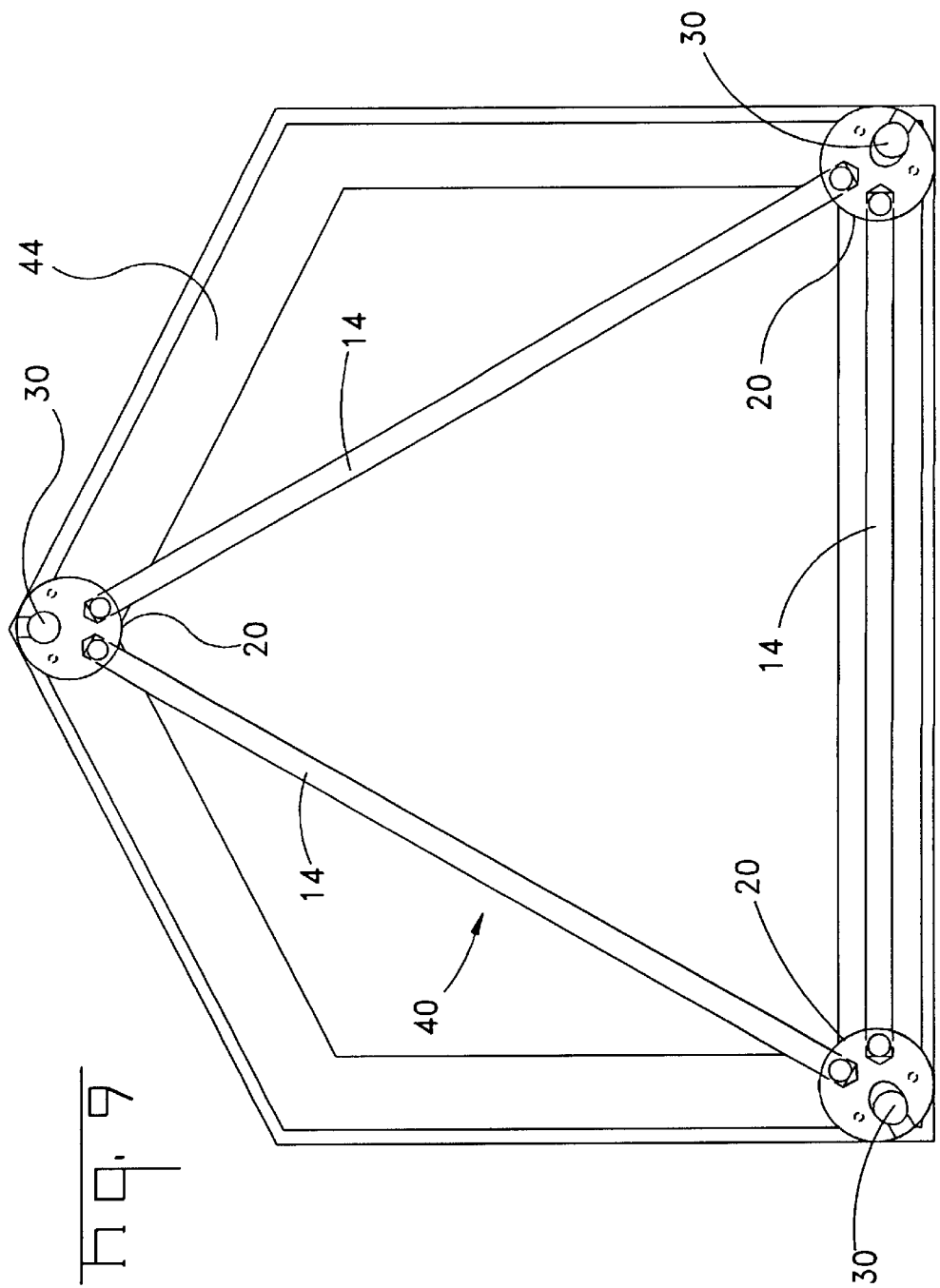

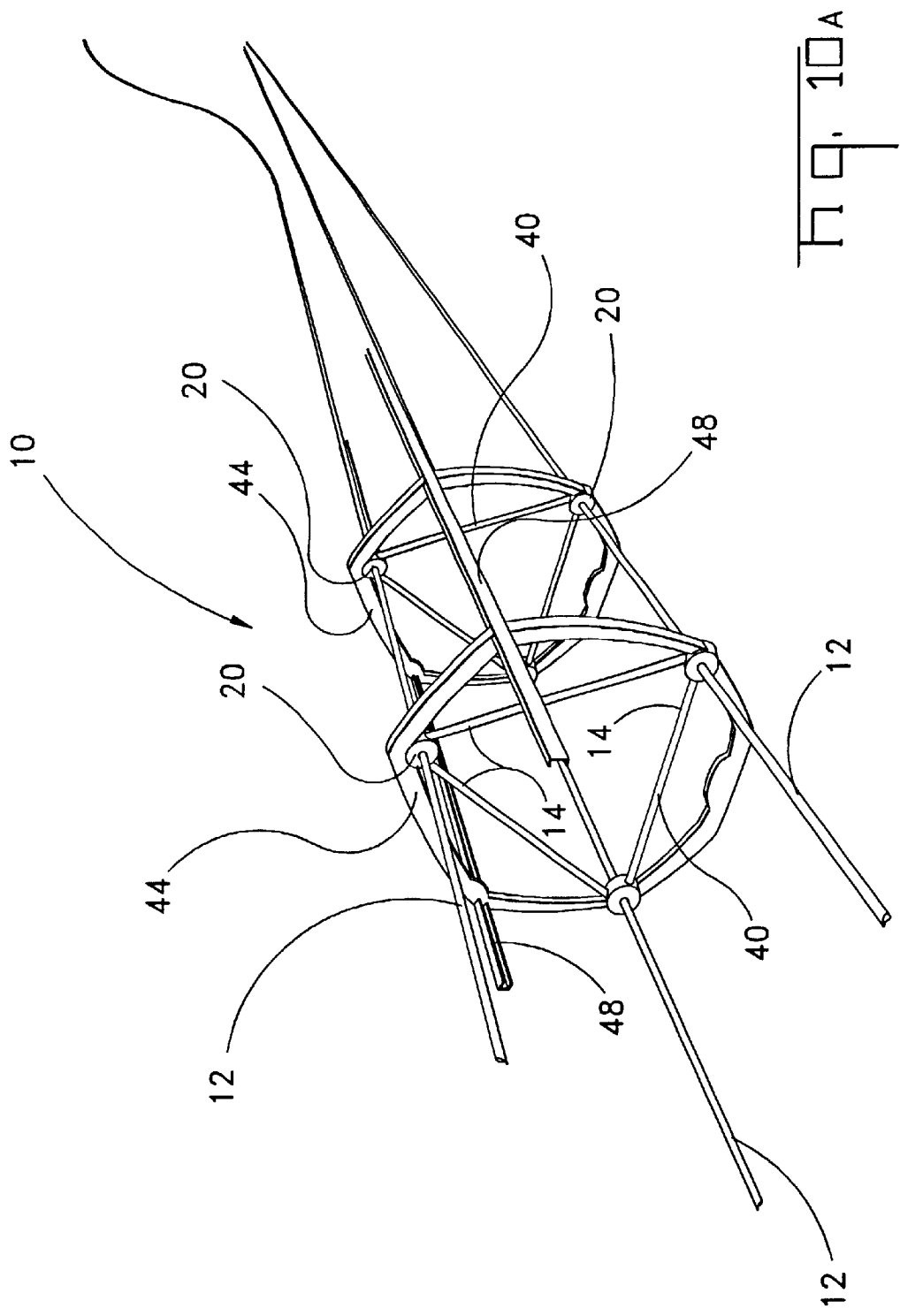

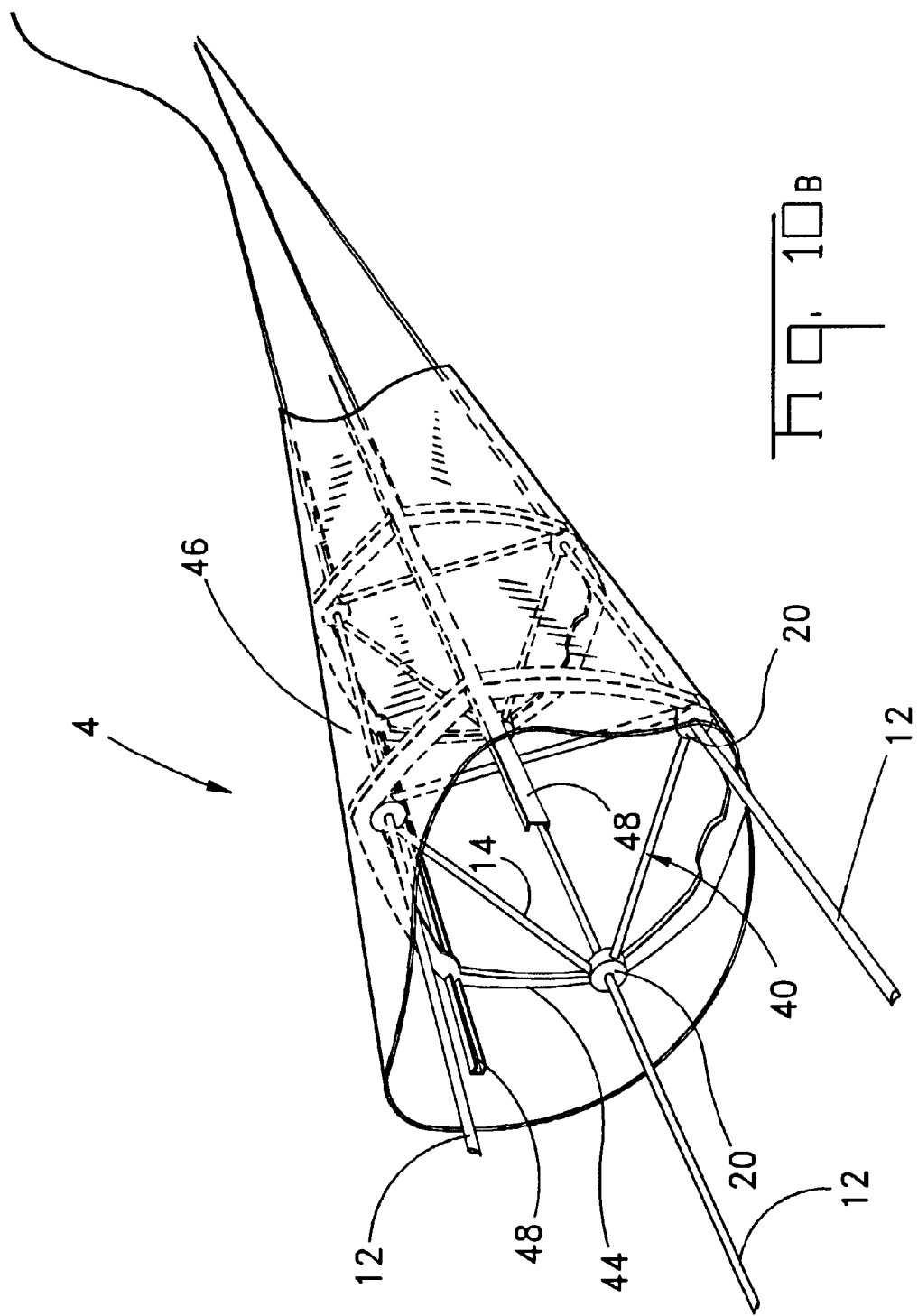

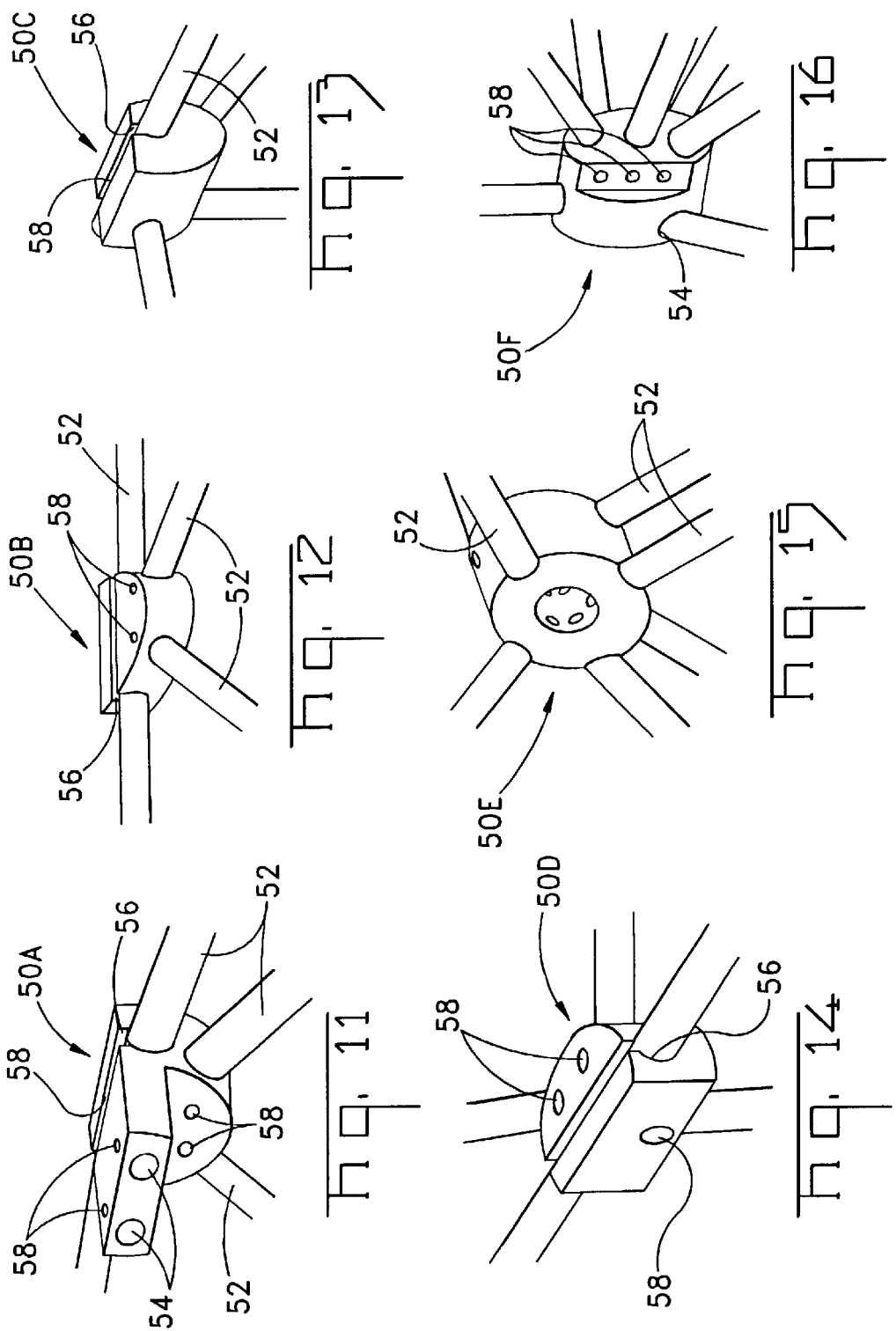

LIGHT AIRCRAFT FUSELAGE AND STRUCTURAL FRAME CONNECTORS

BACKGROUND OF THE INVENTION

1. Field of the Invention

This invention is related to the fabrication of truss or frame structures, such as those used in an aircraft fuselage and to structural connectors that can be used not only to connect tubular members forming the structure, but which also serve as jigs for assembling the components of the structure.

2. Description of the Prior Art

There are a number of methods of fabricating an aircraft structure, in particular a fuselage structure suitable for use in a light aircraft. One approach employs a structural frame or truss to support all or substantially all of the loads or forces that must be carried by the fuselage. Another approach, commonly employed on larger or more sophisticated aircraft is to employ a fuselage constructed of thin sheets or webs of sheet metal. The sheets are suitable for resisting shear or tension loads in the plane of the sheets. These sheets must be stiffened by members more capable of carrying compression loads and loads normal to the sheet, or skin or web. Semimonocoque structures employ thin webs, such as the skin or a fuselage, to carry tension and shearing forces and stiffeners to carry compression or normal loads. A semi-monocoque fuselage structure typically employs closely spaced rings or bulkheads, which resist loads in transverse planes, while the fuselage shell resists loads in the longitudinal direction. Additional longitudinal structural members, such a stiffeners, stringers or longerons span between bulkheads and transfer loads to the bulkheads.

The simpler trusses or frames commonly employed in light aircraft commonly employ chrome-molybdenum steel tubes. Tubular frame structures formed from welded chrome-molybdenum tubes are the standard structural components used in light and ultralight aircraft. These tubular frame structures or trusses are commonly employed with a fabric or non-load bearing outer surface or external skin. They also require extensive bracing and cross bracing.

Welding is used extensively for steel-tube truss structures, such as fuselages. The most common type of welding consists of heating parts to be joined by means of an oxyacetylene torch and then fusing them together with a welding rod. The tensile strength at the weld can become similar to that of cast metal, and it is more brittle and less able to resist shock and vibration loading than is the original material. Aircraft tube walls are thin and more difficult to weld than other machine and structural members. At one time all aircraft welding was torch welding, but electric arc-welding has also been used. For arc-welding, the welding rod forms an electrode from which current passes in an arc to the parts being joined. The electric arc simultaneously heats the parts and deposits weld metal from the electrode. Heating is more localized than for torch welding, and the strength of the heat-treated parts is not impaired as much by arc-welding.

The strength of conventional welded joints depends largely on the skill of the welder. The stress concentrations can vary and it is customary to design welded joints for aircraft fuselages with a liberal margin of safety. Welded joints should be in shear or compression but design often dictates that tensile loads must be applied to a welded joint. Steel tubes, such as chrome-molybdenum alloy tubes, are usually spliced by prior art fish mount joints as shown in FIG. 17. These joints are designed so that most of the weld is in shear and so that most of the weld is not confined to one cross section of the tube. If a butt weld in necessary, the weld should be diagonal and not perpendicular to the centerline of the tube, as shown in the prior art weld of FIG. 18.

Fuselage truss members are often welded as shown in the prior art weld shown in FIG. 19. In that Figure only the horizontal member is highly stressed. If members other than the horizontal member are stressed, common prior art practice is to insert gusset plates as shown in FIG. 20. Steel tubes often have walls as thin as 0.035 in. The welder must control the temperature to keep from overheating the thin walls and burning holes in them. It is extremely difficult to weld a thin member to a heavy one, as more heat is required for the heavy member. The thickness ratio of parts being welded should be less that 3:1, and preferably less than 2:1.

Conventional concentric butt welded fuselage joints between tubes in aircraft and fuselage structure may be satisfactory where vibration is not present. However, the fatigue strength of butt welded joints is compromised when subject to reverse bending. Therefore common practice requires that finger plates or insert gussets should be added to joints subject to vibration. Indeed, the standard practice used in fabricating light and ultralight aircraft is to weld gusset plates at welded intersections of tubes in the fuselage and cabin. However, the configuration of the different welded joints in an aircraft fuselage is generally not uniform. This lack of uniformity gives rise to two problems. First that shape of the tubular members at different joints will be different, in part because of the orientation of the tubular members entering that joint, and the shape of the gusset plates will also differ from joint. This means that a large number of different parts are necessary and that jigs are necessary both for the fabrication of different components as well as for the assembly of multiple components at each joint. The integrity of the welded structure is also dependent upon the skill of the welder, and each weld can take a relatively large amount of time to complete.

Another approach to connecting thin-wall hollow tubes to create a lightweight three dimensional truss structure that can be used in aircraft is shown in U.S. Pat. No. 4,624,599. According to the method disclosed in that patent, the ends of coplanar tubes are partially flattened into an elongated flattened oval shape. Portions of the ends of the tubes are cut away so that the oval ends can be partially telescoped to fit in a mutually nesting relationship with partially flattened ends overlapping. Multi-layer sandwich splice plates are located on the interior of the oval end sections and the plates are bolted to the flattened ends of the tubes so that the tubes can be clamped together. An overlying bracket including formed end plates and welded gussets is used to connect tubes extending in different planes. It would appear that each of these joints would require considerable fabrication and assembly. Not only are the tube ends to be deformed into an oval shape, but the ends of the tubes are machined so that the tube ends can partially telescope at a prescribed angle. Each splice plate is also formed from multiple components which must be separately machined and assembled. Not all joints in an aircraft structure, such as a fuselage, have the same configuration, so it would appear to be necessary to separately machine, form and fabricate and assemble different subcomponents at each joint, and fabricate multiple dies for different joint components. As such, this approach would appear to be a rather expensive way to fabricate a light aircraft.

SUMMARY OF THE INVENTION

Structural frames, such as frames forming an aircraft fuselage or cabin, fabricated using these prior art techniques tend to be labor intensive to assembly, especially when gussets must be welded to the tubular members, and when the shape of the components, such as gusset plates, must be different for virtually all nodes of the frame. A large number of different parts are required and the quality and integrity of welds are often dependent on the skill of the welder. Care must also be taken to insure that the load carrying capacity of the tubular members is not diminished by the welds and that appropriate safety margins are not compromised. It is also important that the overall weight of the structure does not become too great. The instant invention, comprising a method of assembling and welding a structural frame, such as an aircraft fuselage, and components employed in the frame, addresses these problems. This invention also provides a simple and relatively inexpensive means to fabricate a light aircraft structure.

A method of assembling an aircraft fuselage, according to this invention, includes the following steps. Connector blocks are formed with bore holes extending from edges and through holes extending between opposite faces. Ends of a first set of lateral tubes are inserted into bore holes in connector blocks. The bore holes in individual connector blocks are oriented to function as jigs to properly orient the tubes to form a portion of an aircraft fuselage frame. A second set of longitudinal tubes are inserted into the through holes so that the tubes in the second set extend continuously through the connector blocks. The tubes in the second set form longitudinal members in the aircraft fuselage. The through holes are oriented to function as jigs to properly orient longitudinal members relative to each other and relative to the remainder of the aircraft fuselage.

More specifically the method of fabricating an aircraft fuselage according to this invention includes the step of assembling a series of triangular bulkheads. Each bulkhead has three tubular members assembled to connector blocks at the apices of each triangular bulkhead. Each connector block has two bore holes extending into a peripheral edge of the connector block. Each triangular bulkhead is assembled by inserting opposite ends of each of the three tubular members into bore holes in the connector blocks. Longerons are inserted into through holes on the connector blocks so that a series of triangular bulkheads are positioned at spaced longitudinal positions on the longerons to form an internal frame for the aircraft fuselage. An external skin can be added attached to the connector blocks to form a double fuselage with both the truss or frame and the outer skin carrying loads or forces applied to the aircraft fuselage. The tubes can also be welded to the connector blocks.

The assembly constructed according to these methods includes tubular members and structural connectors for use in connecting the tubular members to form a structural frame, such as an aircraft fuselage frame or truss. The structural connectors comprise a block having a thickness greater than an external diameter of tubular members to be connected by the corresponding structural connector. At least one bore hole extends into the block from a peripheral edge of the block. The peripheral edge extends between opposite faces of the block. The bore hole has an inner diameter sufficient for insertion of an end of a tubular member into the bore hole. A through hole extends between the opposite faces of the block. The through hole has a diameter sufficient to permit a second one of the tubular members to pass through the block. The block connects at least two tubular members to form a portion of the structural frame or fuselage. The tubes can be plug welded to the structural block, and the bore holes and through holes function as jigging means for properly assembling the tubular members.

These structural connectors can also include a transverse hole extending from one face of the block and intersecting a bore hole, that extends inwardly beyond the transverse hole. The transverse hole permits an assembler to determine if the end of the tubular section is fully inserted into the bore hole. The transverse hole can also provide an opening for plug welding the structural connector to the tubes.

An aircraft frame using these structural connector blocks and constructed according to this method has a plurality of tubular sections connected by a plurality of connector blocks and an external skin. The tubular sections comprise both longerons and lateral tubular sections. The connector blocks connect a plurality of lateral tubular sections to each longeron at multiple longitudinal positions on each longeron. The external skin is attached to the connector blocks so that loads, applied to the aircraft frame, are carried by both the tubular sections and the external skin. Lateral tubular sections or members form bulkheads in which the tubular members are joined together at the ends thereof by the connecting blocks located at apices of each bulkhead. The connecting blocks also connecting the bulkheads to the longerons.

BRIEF DESCRIPTION OF THE DRAWINGS

FIG. 2 is a view of the tubular frame forming the cabin section and the fuselage of the aircraft according to this invention.

FIG. 3 is a view of the fuselage frame including a forward bulkhead subassembly of the aircraft shown in FIGS. 1 and 2.

FIG. 4 is a view of a forward face of a representative structural connector used to connect tubular sections in the fuselage frame structure shown in FIGS. 2 and 3.

FIG. 5 is a edge view of the structural connector shown in FIG. 4.

FIG. 6 is a front view of a structural connector used to connect and inclined longeron with lateral tubular members forming part of a tubular bulkhead structure in the fuselage structure of FIGS. 2 and 3.

FIG. 7 is a view of the rear face of the structural connector shown in FIG. 6.

FIG. 9 is a view of the front bulkhead subassembly shown in FIG. 3.

FIGS. 10A and 10B are views of the fuselage showing the manner in which the external skin is affixed to the structural frame to form a dual fuselage structure.

FIGS. 11–16 are views of structural connectors employed in assembling the cabin structure shown in FIG. 2. The size of these structural connectors is such that they are not shown in FIG. 2, but the location of each of the connectors shown in FIGS. 11–16 is indicated on FIG. 2.

DETAILED DESCRIPTION OF THE PREFERRED EMBODIMENT

Figure 1:
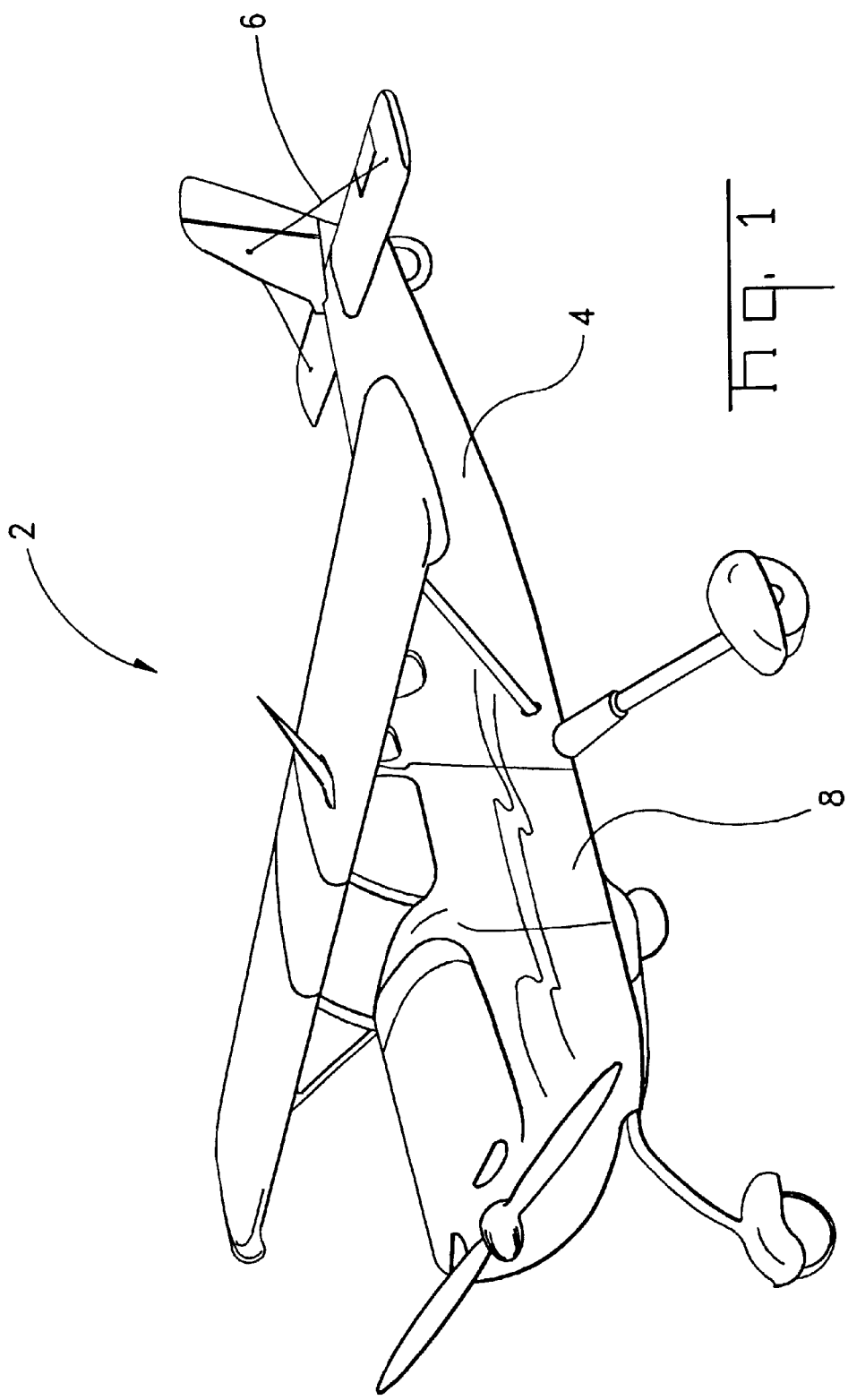
FIG. 1 is a three dimensional view of a light aircraft of the type that employs a fuselage structure in accordance with this invention.

A light aircraft 2, of the type shown in FIG. 1, can employ a welded structure or frame 10 in the aircraft fuselage 4. This frame includes chromium molybdenum steel longitudinal tubular members 12 and lateral tubular members 14 that are connected by structural connectors 20 located intermediate the ends of the longitudinal tubular members 12 and at intersecting ends 16 of lateral tubular members 14. At least one of these longitudinal tubular members extends into the tail section or empennage 6. The load bearing structure of the fuselage 4 includes both this structural frame or truss and the external sheet metal skin 46 that is riveted to the structural connectors or connector blocks 20 to form a fuselage assembly 10. Other tubular members 52 and structural connectors 50 form the frame or truss for the aircraft cabin 8, as shown in FIG. 2. The fuselage structural connectors 20 and the cabin structural connectors 50 not only serve to interconnect the tubular members and to attach the aircraft skin, but as will be subsequently discussed in greater detail, these structural connectors 20, 50 also serve as jigs to simplify the assembly of the aircraft structure.

The longitudinal tubular members 12 and the lateral tubular members 14 in the preferred embodiment are chromium molybdenum steel tubes of varying diameters and thicknesses, but would include tubes having a diameter of 0.500 inch and a wall thickness of 0.058 inch. Steel tubes of this type are commonly used in light aircraft construction. The structural connectors 20, 50 are formed from chromium molybdenum steel bar stock. The longitudinal tubular members 12 and the lateral tubular members 14 are attached and welded to the structural connectors 20, and the cabin tubular members 52 are welded to the cabin structural members 50. In the preferred embodiment of this invention, plug welds are employed. A plug weld is a circular fusion weld, involving partial melting of the base or parent metal, made in holes in the structural connectors 20, 50. The plug welds in the preferred embodiment of this invention are made by Tungsten-inert gas welding or TIG welding, where an arc plasma from a nonconsumable tungsten electrode radiates heat onto the work surface. A weld puddle is created in a protective atmosphere provided by a flow of inert shielding gas. Heat must then travel by conduction from this puddle to melt the desired depth of weld. In the preferred of this invention, a filler material is added to complete the weld of the tubular members to the structural connectors.

Although the dimensions of the individual structural connectors or connector blocks 20 employed in the fuselage frame structure 12 differ depending upon the point in the frame in which they are employed, the differences need not be discussed in detail. These differences in the structural connectors 20 are primarily in the location, orientation and dimensions of holes or openings in the connector blocks 20 to properly receive and align the longitudinal tubular members 12 and the lateral tubular members 14 along the tapered fuselage assembly.

In the preferred embodiment, as shown in FIGS. 4–7, each of the fuselage structural connectors 20 comprises a cylindrical member having a substantially circular cross section. In the preferred embodiment, a cylindrical peripheral edge 22, having a thickness of 0.750 inch, extends between opposite faces 24, but connectors having a different thickness could also be employed. The solid structural connectors 20, formed from steel bar stock, include bore holes 26 drilled into the peripheral edge 22, and drilled through holes 30 extending between opposite faces 24. Each bore hole 26 has a closed end 28. Transverse or plug holes 32 are drilled from one of the faces 24 to intersect a corresponding bore hole 26. Each transverse hole intersects the corresponding bore hole 26 between the closed bore hole end 28 and the peripheral edge 22 through which that bore hole extends. Transverse or plug openings 34 extend from an adjacent portion of the peripheral edge 22 and intersect the through holes 30. The transverse opening 34 can be drilled holes or slots extending along the peripheral edge 22 between opposite faces 24.

The closed end bore holes 26 in structural connectors 20 have an inner diameter sufficient for insertion of the end of a lateral tubular member or tube 14. A relatively tight fit is preferred. When fully inserted into a bore hole 26, the lateral tubular member end 16 extends beyond the intersection of the transverse hole 32 with the bore hole 26. The transverse holes 32 thus permit observation to determine if the lateral tubular members 14 are fully inserted into the bore holes 26. The transverse holes 32 also serve as plug holes in which a plug weld can be formed between the lateral tubular members 14 and the structural connectors 20. In the preferred embodiments of this fuselage structural connector 20, the axis of each bore hole 26 extends perpendicular to the axis of revolution of the cylindrical structural connector block 20, although this perpendicular orientation can be altered in other configurations.

The through holes 30 have an inner diameter sufficient to permit insertion of longitudinal members 12. A relatively tight fit is preferred. The axes of the through holes 30 will typically extend at an acute angle relative to the axis of revolution of the cylindrical connector block 20. In an aircraft fuselage 4, the longitudinal members 12 will not be mutually parallel because the cross section of the fuselage 4 is smaller adjacent the tail section 6 than adjacent to the cabin 8. In some cases, the through holes 30 will extend at a compound angle relative to the faces 24 of the connector block 20. In other words, the axis of a through hole 30 may extend at an acute angle relative to each of three orthogonal axes in which the axis of revolution of the cylindrical block 20 is one of those axes. The through holes 30 will then serve to orient the longitudinal tubular members 12 that fit tightly in the corresponding through hole 30. The mutual orientation of different longitudinal members 12 will thus be maintained by structural connectors 20 that are interconnected by lateral tubular members 14. The transverse openings 34 intersecting the through holes 32 form plug holes in which a plug weld can be formed. However, if the tolerances of the through holes 30 are sufficiently accurate, the longitudinal tubular members 12 can be held in proper position without any welds.

Figure 8:
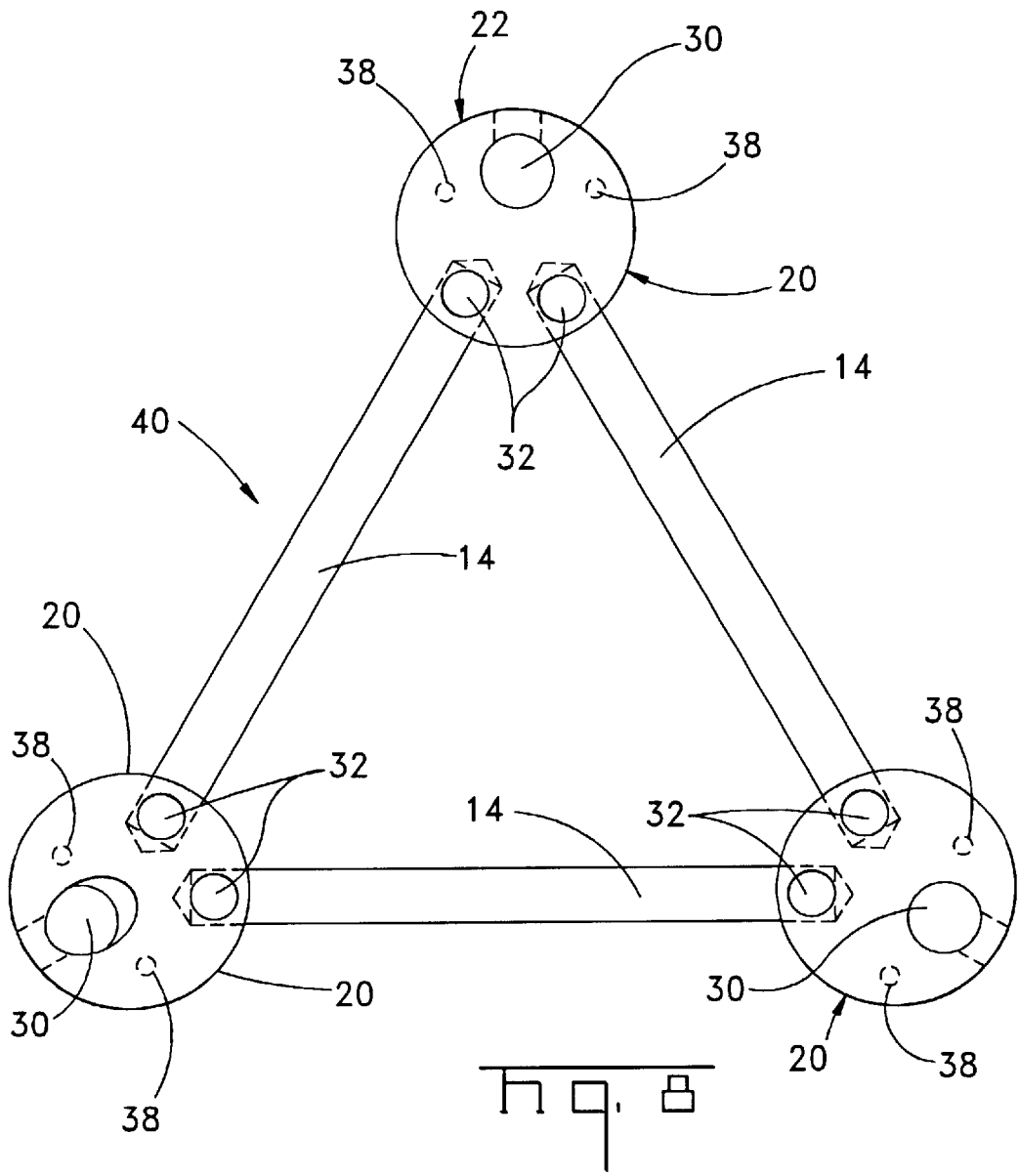
FIG. 8 is a view of a triangular frame using the structural connectors shown in FIGS. 4–7. This triangular frame forms a part of one of the bulkhead subassemblies in the fuselage structure shown in FIGS. 2 and 3.
Figure 17:
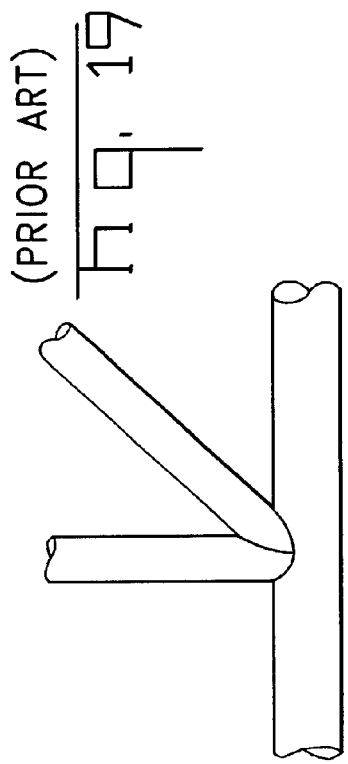
FIG. 17 is a view of a prior art fish mount welded joint that can be used on an aircraft fuselage.
Figure 19:
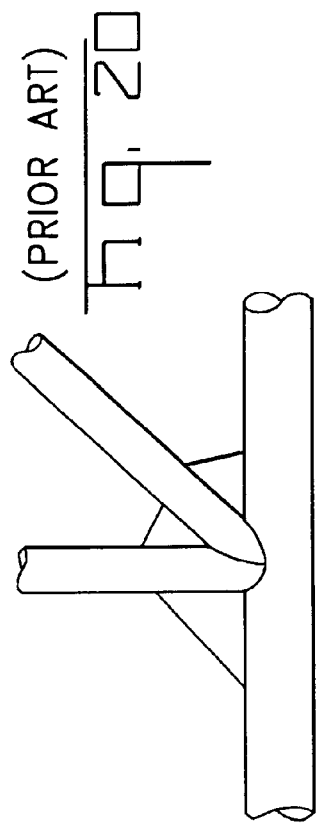
FIG. 19 is a view of a prior art fuselage truss weld.
Figure 18:
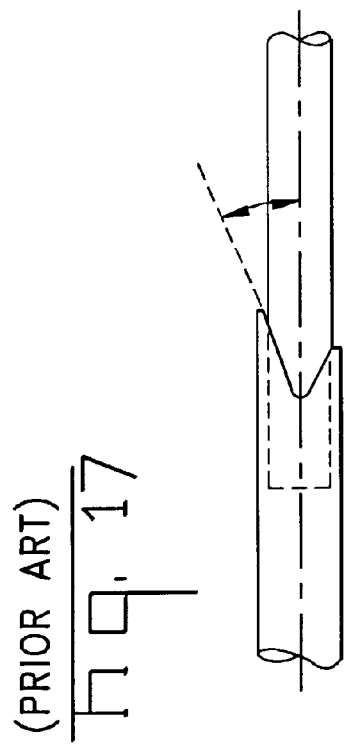
FIG. 18 is a view of a prior art nutt weld that can be used on an aircraft fuselage.
Figure 20:
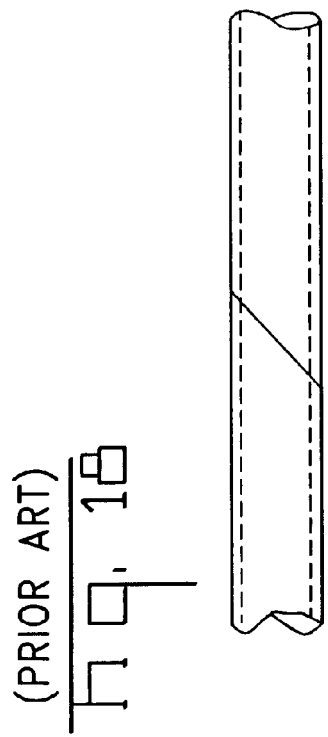
FIG. 20 is a view of a prior art fuselage gusseted truss weld.

The fuselage structural connector 20 of the preferred embodiment are used to form a triangular section or subassembly 40 that includes three structural connectors 20A, 20B and 20C located at the apices of three lateral tubular members 14 forming the sides of the triangular section, as shown in FIG. 8. Each of these structural connectors 20A, 20B and 20C has two bore holes 26, the axes of which extend at an angle forming the angles at the three corners of the triangular section 40. The triangular section 40 can be in the form of an equilateral triangle or in the form of a more general triangle, depending upon the desired local geometry of the fuselage 4.

Each of the three structural connectors 20A, 20B and 20C also includes one through hole 30 that is located between the center or centroid 36 of the block and an adjacent portion of the peripheral edge 22. In the preferred embodiment the through hole 30 is substantially aligned with and is intersected by the axes of the bore holes 26 located in the same block 20.

The triangular subassembly 40 is fabricated by inserting lateral tubular members 14 into the bore holes 26. If the clearance is sufficiently tight, as desired, the tubular members 14 can be simultaneously inserted into the bore holes 26 of the three structural connectors 20 to form the triangular section. The lateral tubular members 14 should primarily be loaded in compression since they will form a tubular frame in a bulkhead assembly 42 in the fuselage 4. If the tolerances are sufficiently tight, the structural connectors 20 and the lateral tubular members 14 in this triangular configuration will be able to carry loads placed on this subassembly without requiring any additional fastening or securing means. However, the structural connectors 20 include transverse or plug weld holes 32 that provide space for a plug weld between each structural connector 20 and the lateral tubular members 14 connected thereto. Plug welds at these points do secure the lateral tubular members 14 in place, but these welds should not be subjected to significant loads.

Each structural connector 20 in each triangular subassembly also includes a through hole 30 that will receive a longitudinal tubular member or longeron 12. The longerons 12 extend continuously through the holes 30 and are not connected or welded to the structural connectors 20 at the ends of the longerons 12. In the preferred embodiment, the longerons or longitudinal tubular members 12 extend from the aircraft tail section or empennage 6 to the cabin 8. These continuous members 12 can thus carry tensile loads along their complete length. If the through holes 30 are drilled to sufficiently tight tolerances the longerons 12 will fit snugly in the structural connectors 20. The longerons 12 will not be parallel in the preferred embodiment of this fuselage frame assembly 10. As shown in FIG. 10A the topmost longeron 12 will be formed so that it will continue to form the leading edge structural member for the vertical stabilizer in the tail section 6. In view of the relative shapes and relative orientation of the three longerons 12 where they pass through each structural connector 20, the axes of the three through holes 30 in each of the three structural connectors 20 will not typically be parallel. As mentioned earlier, the through holes 30 is some structural connectors 20 will not be parallel to the axis of revolution of the cylindrical connector 20, nor will these through holes 30 extend perpendicular to the faces 24 through which they extend. Because of the unique orientation of the through holes 30 and the shape of the longerons 12 in the entire fuselage frame assembly 10, the triangular bulkhead subassemblies 40 can typically be positioned at only one location within the frame assembly 10. Thus the entire frame assembly 10 can be assembled with the structural connectors 20 serving not only as a means for connecting the tubular components 12 and 14, but also as a jig to assembly all components in place. To assemble the various components in place, the lateral tubular members 14 are first attached to structural connectors 20 to form triangular bulkhead subassemblies or sections 40, and the longitudinal tubular members or longerons 12 are then inserted through the holes 30 until the lateral subassemblies 40 are positioned at their proper locations. It should be understood that the triangular subassemblies 40 can be positioned on the longitudinal tubular members 12 either before or after the lateral tubular members 14 are plug welded to the structural connectors 20. In either case, the longitudinal tubular members 12 can also be plug welded to the structural connectors 20 through the transverse openings 34 extending through the peripheral edge 22 to intersect with a longitudinally oriented hole 30 through which the longeron 12 extends.

In the preferred embodiment of this invention, the plug welds are formed by TIG welding. Since the structural connectors 20 are fabricated from solid chromium molybdenum steel bar stock, it is possible to preheat each of the three weld locations in each block 20 by simply heating the block. The heat generated by the TIG electrode is sufficient to heat the entire block 20 so that each weld site can be adequately preheated. In the preferred method of assembling the fuselage frame 10, all of the welds are made after the frame has been assembled using the structural connectors 20 as jigs. It then becomes a simple matter to make the three welds to two lateral members 14 and a single longitudinal member 12 in each structural connector 20. The entire frame assembly 10 can then be welded by sequentially forming plug welds in all of the structural connectors 20 during one continuous operation.

The structural connectors 20 serve not only to connect the tubular members 12 and 14 to form the frame 10, but also serve to attach the aircraft or fuselage outer skin 46 to this frame 10. When the sheet metal skin 46 is attached to the frame 10, the truss frame 10 and the outer sheet metal skin 46 both form a double fuselage load bearing structure, since the sheet metal skin can support loads in the plane of the skin 46. Bulkhead panels 44 are first attached to the triangular frame subassemblies 40. These bulkhead panels 44 generally extend laterally relative to the fuselage 4. The panels 44 are parallel to the lateral tubular members 14 and transverse relative to the longitudinal tubular members 12. Panels 44 are open in the center to provide space for cables, hydraulic lines or other conventional equipment extending through the fuselage 4 to the tail section 6. Each panel 44 can comprise a single sheet metal panel or a series of sections that are connected together, either by the structural connectors 20 or by separate fastening means. The panels or panel subassemblies 44 are, however, attached directly to the structural connectors 20. In the preferred embodiment, the panels 44 are secured to the structural connectors 20 by standard aircraft rivets 38 or AN535 drive screws that have been secured to the structural connectors 20 by conventional means. See FIG. 8. In the preferred embodiment, the panels 44 have a peripheral lip that extends generally longitudinally and includes rivets for attaching the panels forming the exterior skin 46 to the panels 44. In this way the panels are connected to the structural connectors 20. Stringers 48 can also be attached to strengthen the exterior skin 46.

The double fuselage assembly fabricated in this manner can be attached to a cabin assembly that also includes structural connectors 50 joining tubular members 52. The tubular members 52 used to form the cabin frame are oriented in much the same manner as in a cabin frame in a comparable aircraft. Representative cabin structural connectors 50, which are similar to fuselage structural connectors 20, are shown in FIGS. 11–16. The location of six individual cabin structural connectors 50A–50F is shown in FIG. 2. These cabin structural members would also be machined from solid steel, preferably chromium molybdenum steel having the same composition as the fuselage structural connectors 20. Cabin structural connectors 50A–50F do not generally have a cylindrical configuration. They are instead machined to fit their specific application. These cabin structural connectors include bore holes 54, through holes 56 and transverse holes 58, which serve the same purpose as those used in the fuselage connectors 20. In other words they are used both as fasteners and as jigs for assembling the cabin frame. Of particular significance is cabin structural connector 50E that forms the main connection point between the topmost longeron 12 and the cabin assembly. By employing structural connectors 20 and 50, the entire aircraft can be easily assembled and welded in an operation the both reduces assembly time and complexity and simplifies welding by eliminating gusset plates and butt welds.

The structure depicted in the representative embodiment is primarily intended for use in the construction of light aircraft, but could be employed in the fabrication of other frames. Structural connectors of the type depicted herein can be used in an aircraft structure either in conjunction with a load bearing external skin or with a non-load bearing fabric skin. These structural connectors can also be used to replace some, but not necessarily all of the joint connections in an aircraft structure. The aircraft structure is also not limited to the precise configuration depicted herein. For example, the cross section of the fuselage could differ from that represented by the preferred embodiment. The shape of the bulkhead panels could be changed to conform to a different fuselage cross section. The embodiment of this invention shown in the drawings and described herein is therefore only representative of numerous other configurations and equivalent structures that would employ the invention defined by the following claims.

We claim:

1. A structural connector for use in connecting tubular sections of a structural frame, the structural connector comprising:
    a block having opposed planar faces and a peripheral edge extending between the two opposed faces;
    at least one bore hole extending inwardly from the peripheral edge, the bore hole comprising means for receiving an end of a tubular section; and
    a transverse hole extending from one face of the block and intersecting the bore hole, the bore hole extending inwardly beyond the transverse hole;
    the transverse hole comprising means for determining if the end of the tubular section is fully inserted into the bore hole.

2. The structural connector of claim 1 wherein the block includes a through hole extending between opposite faces of the block, the through hole extending along a longitudinal axis transverse to a lateral axis of the bore hole.

3. The structural connector of claim 2 wherein a second transverse hole extends between the peripheral edge and the through hole.

4. The structural connector of claim 3 wherein each transverse hole comprises an opening means for welding tubular members crossing the transverse hole to the block.

5. The structural connector of claim 1 wherein the transverse hole has a size sufficient to permit formation of a plug weld with a tubular section positioned in an intersecting bore hole.

6. The structural connector of claim 1 wherein the bore holes and transverse holes have the same diameter.

7. The structural connector of claim 1 wherein a through hole extending between opposite faces of the block and along a longitudinal axis transverse to a lateral axis of the bore hole, and wherein the through hole is offset relative to the centroid of the structural connector.

8. The structural connector of claim 1 wherein two bore holes extend into the peripheral edge of the block, axes of the two holes intersecting to form an acute angle.

9. The structural connector of claim 1 including rivets extending from one face of the block.

10. The structural connector of claim 1 wherein the block includes a through hole extending between opposite faces of the block, and an opening in the peripheral edge of the block intersecting the through hole.

11. An assembly comprising tubular members and a structural connector for use in connecting the tubular members to form a structural frame, the structural connector comprising:
    a block having a thickness greater than an external diameter of tubular members to be connected by the structural connector;
    at least one bore hole extending into the block from a peripheral edge of the block, the peripheral edge extending between opposite planar faces of the block, the bore hole having an inner diameter sufficient for insertion of an end of a tubular member into the bore hole; and
    a through hole extending between the opposite faces of the block, the through hole having a diameter sufficient to permit a second one of the tubular members to pass through the block;
    the block comprising means for welding at least two tubular members to form a portion of the structural frame.

12. The assembly of claim 11 wherein each bore hole has a closed end spaced from the peripheral edge of the block.

13. The assembly of claim 11 wherein the through hole comprises a hole drilled at a compound angle.

14. The assembly of claim 11 wherein two bore holes extend inwardly from the peripheral edge, the two bore holes being positioned such that two tubular members positioned in the two bore holes extend at an acute angle relative to each other.

15. The assembly of claim 14 wherein centerlines of each of the two bore holes intersect the through hole and the through hole is located between the centroid of the block and the peripheral edge of the bock.

16. The assembly of claim 11 wherein rivets are positioned on one face of the block.

17. The assembly of claim 11 wherein the block comprises a cylindrical block.

18. The assembly of claim 11 wherein the through hole is offset relative to the centroid of the block.

19. The assembly of claim 11 wherein the tubular members are welded to the block.

20. The assembly of claim 11 wherein the frame comprises at least one triangular section having structural connectors at each apex of the triangular section, with lateral tubular members extending between the structural connectors and with longitudinal tubular members extending transversely relative to and through structural connectors at each apex of the triangular section.

21. An aircraft fuselage comprising an internal frame and an external skin covering the internal frame, the frame comprising a plurality of longerons wherein each connecting block includes at least one bore hole for receiving a tubular member, and a tranverse hole intersecting the bore hole, the corresponding tubular member extending into the bore hole past the transverse hole and a plurality of bulkheads supporting the longerons at longitudinally spaced positions, each bulkhead comprising tubular members joined together at the ends thereof by connecting blocks located at apices of each bulkhead, the connecting blocks also connecting the bulkheads to the longerons.

22. The aircraft fuselage of claim 21 wherein each bulkhead comprises a triangular structure including three tubular members joined at adjacent ends thereof by three connecting blocks.

23. The aircraft fuselage of claim 21 wherein the tubular members comprising the bulkhead are welded to the connecting blocks.

24. The aircraft fuselage of claim 23 wherein the tubular members are plug welded to the connecting blocks.

25. The aircraft fuselage of claim 21 wherein the longerons comprise tubular members.

26. The aircraft fuselage of claim 21 wherein the external skin is attached to the connecting blocks.

27. The aircraft fuselage of claim 26 wherein the external skin is riveted to the connecting blocks.

28. The aircraft fuselage of claim 21 wherein the longerons are welded to the connecting blocks.

29. An aircraft frame comprising a plurality of tubular sections connected by a plurality of connector blocks and an external skin, the tubular sections including longerons and lateral tubular sections, the connector blocks connecting a plurality of lateral tubular sections to each longeron at multiple longitudinal positions on each longeron, the external skin being attached to the connector blocks so that loads applied to the aircraft frame are carried by both the tubular sections and the external skin.

30. A method of assembling an aircraft fuselage comprising the steps of:

forming bore holes and forming through holes extending between opposite planar faces, in connector blocks; and inserting the ends of a first set of tubes into bore holes in connector blocks, the bore holes in individual connector blocks being oriented to function as jigs to properly orient the tubes to form a portion of an aircraft fuselage frame;

inserting a second set of tubes into the through holes so that the tubes in the second set extend continuously through the connector blocks, the tubes in the second set forming longitudinal members in the aircraft fuselage, the through holes being oriented to function as jigs to properly orient longitudinal members relative to each other and relative to the remainder of the aircraft fuselage.

31. The method of claim 30 comprising the additional step of welding at least a portion of the tubes, in the first set, to connector blocks located at the ends thereof.

32. The method of claim 31 wherein the tubes in the first set are plug welded to connector blocks.

33. The method of claim 30 wherein the aircraft fuselage comprises a cabin section and a tail boom section, the first set of tubes and connector blocks joining tubes in the first set being positioned in both the cabin section and the tail boom section of the fuselage.

* * * * *